US006497833B1

(12) United States Patent
Tayebi

(10) Patent No.: US 6,497,833 B1
(45) Date of Patent: Dec. 24, 2002

(54) COLORED LAMINATE AND A METHOD FOR COLORING THE SURFACE OF A MEMBRANE

(76) Inventor: Amad Tayebi, 5 Sequoia Rd., Westford, MA (US) 01886

( * ) Notice: Subject to any disclaimer, the term of this patent is extended or adjusted under 35 U.S.C. 154(b) by 255 days.

(21) Appl. No.: 09/677,713

(22) Filed: Sep. 30, 2000

Related U.S. Application Data

(60) Provisional application No. 60/156,723, filed on Sep. 30, 1999.

(51) Int. Cl.[7] ............................................... B29C 39/20
(52) U.S. Cl. ...................... 264/173.1; 264/212; 156/279
(58) Field of Search ........................ 264/173.1, 172.19, 264/173.11, 212; 156/244.12, 283, 279

(56) References Cited

U.S. PATENT DOCUMENTS

| | | | | |
|---|---|---|---|---|
| 4,044,185 A | * | 8/1977 | McCaskey et al. | 162/128 |
| 4,655,861 A | * | 4/1987 | Kiss | 156/62.2 |
| 4,927,070 A | * | 5/1990 | Kretchmer | 228/155 |
| 5,401,457 A | * | 3/1995 | Valyi | 264/511 |
| 5,403,631 A | * | 4/1995 | Sato et al. | 156/242 |
| 5,773,373 A | * | 6/1998 | Wynne et al. | 442/246 |

* cited by examiner

Primary Examiner—Mark Eashoo

(57) ABSTRACT

In this method, a fibrous material is embedded between the surfaces of a membrane and a dissimilar coloring material as the mating surfaces of the membrane and the coloring material are cured or cosolidify. This results in an encapsulation bond where fibers embedded in and originating from within the membrane are also embedded in and terminating within the adjacent coloring material. This method also results in delamination-resistant colored laminates comprising dissimilar layers and having a permanent and durable bond between the various layers of the composite.

1 Claim, 5 Drawing Sheets

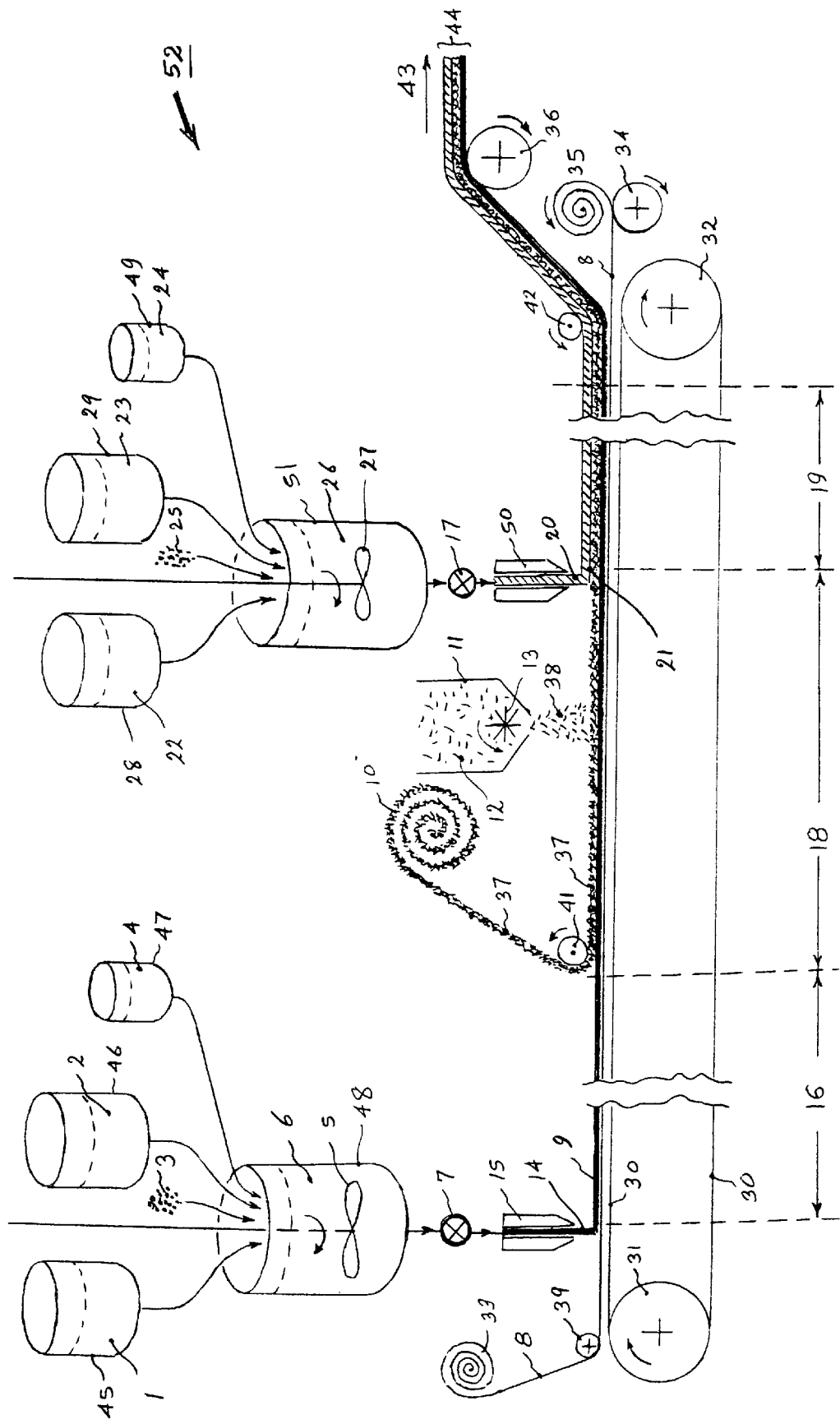
Figure (1)

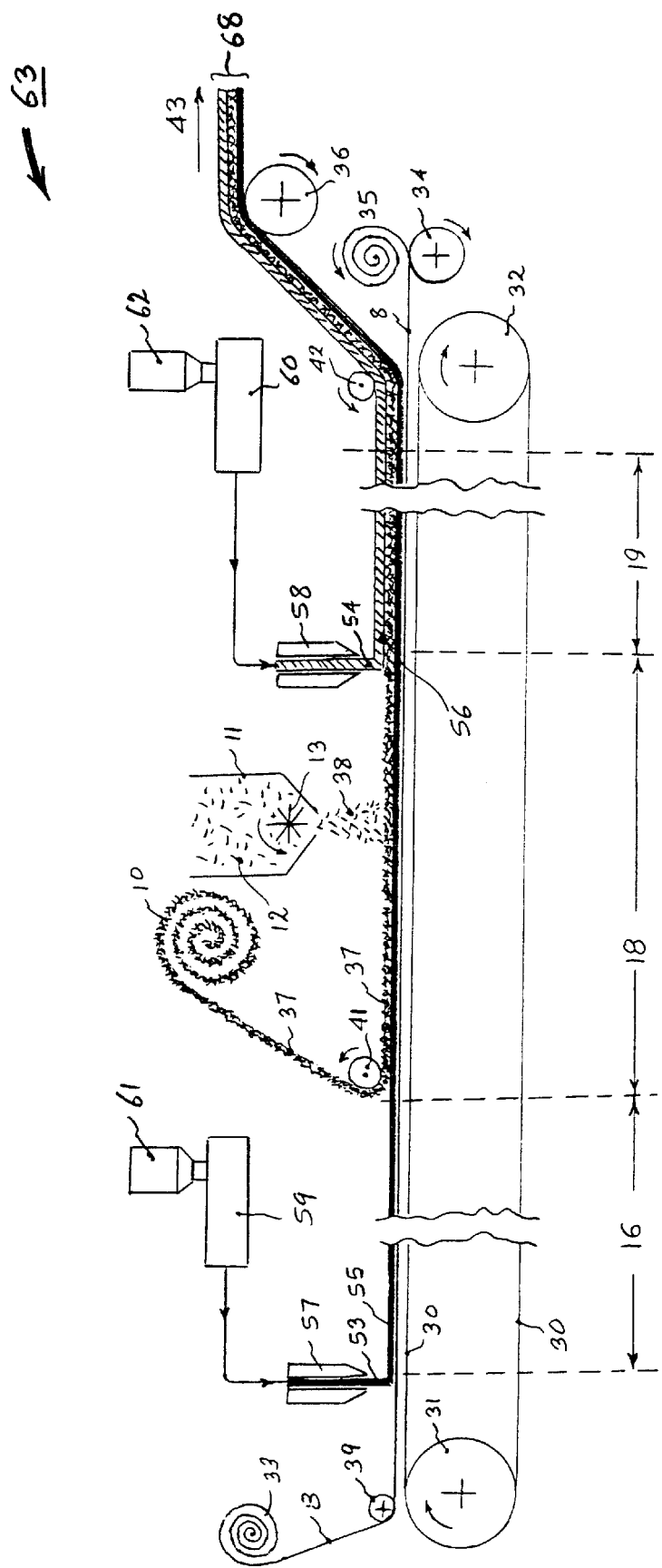
Figure (2)

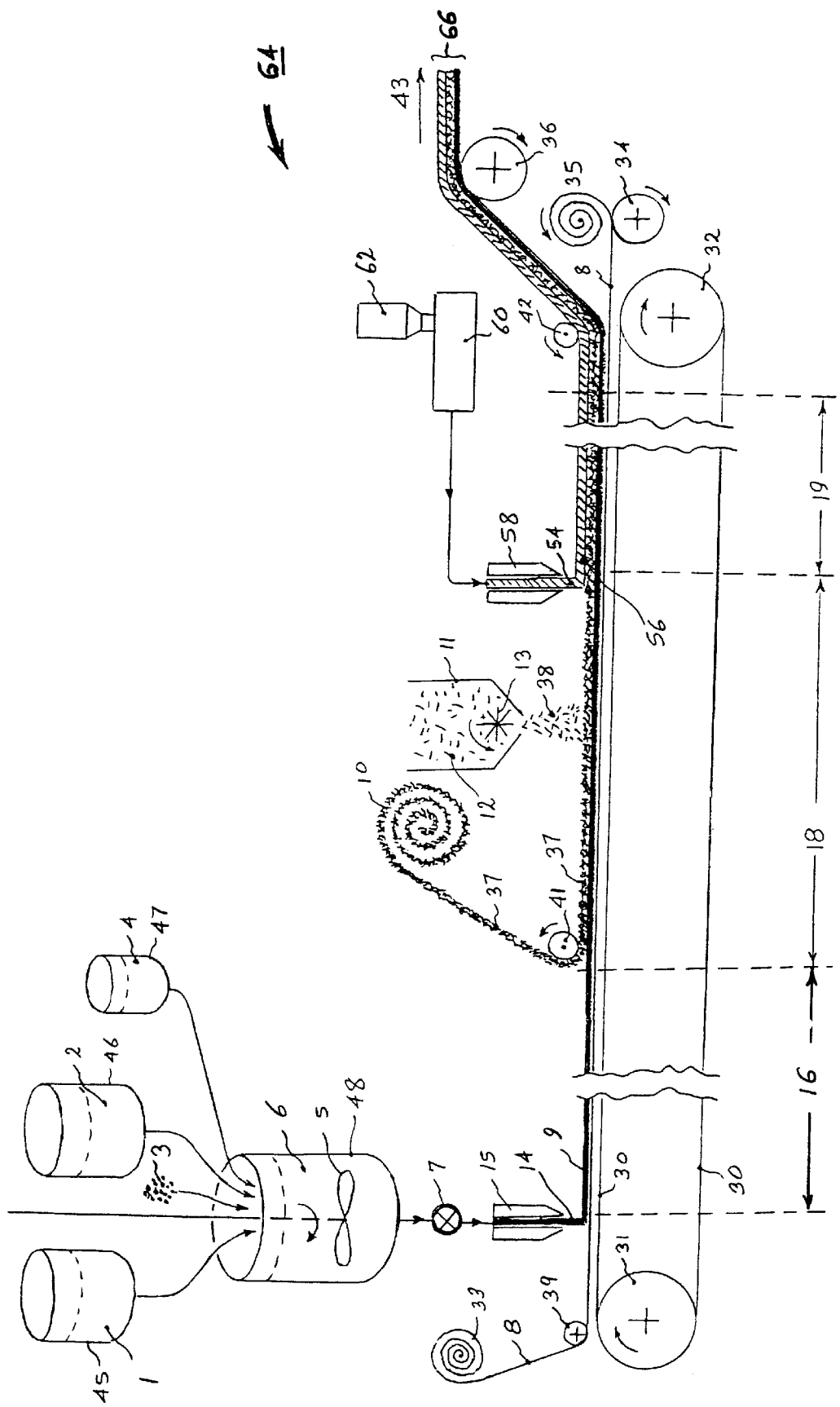
Figure (3)

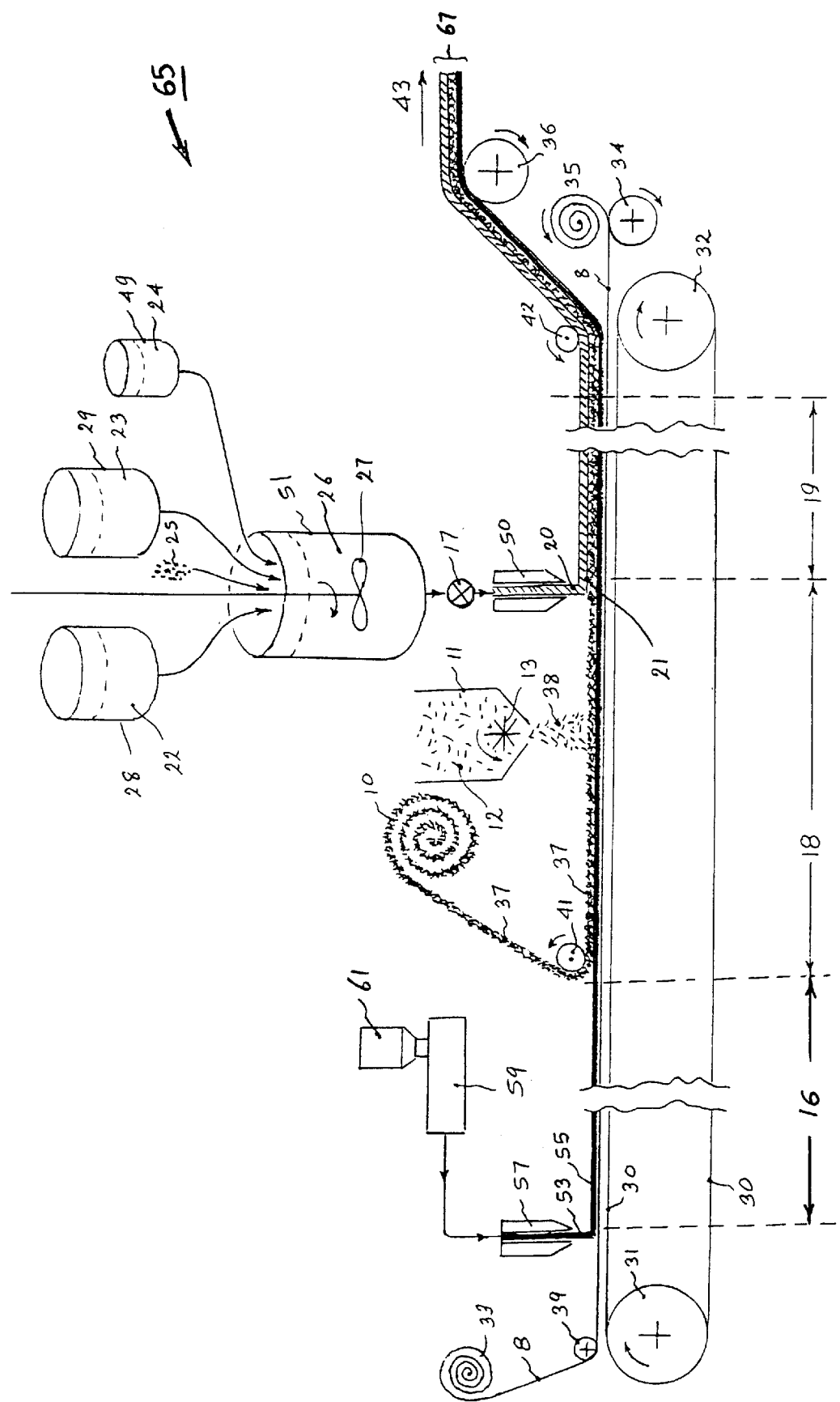
Figure (4)

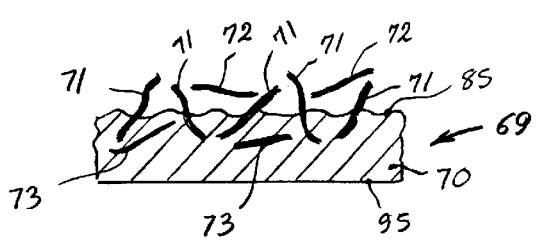
Figure (5)
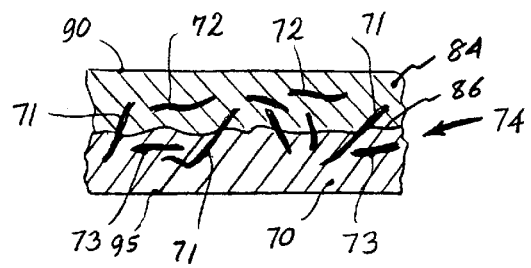
Figure (6)
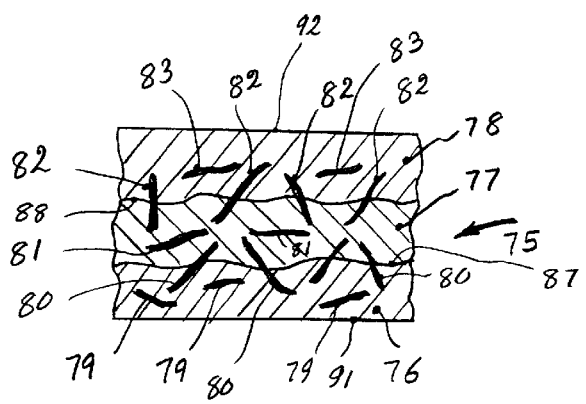
Figure (7)

US 6,497,833 B1

COLORED LAMINATE AND A METHOD FOR COLORING THE SURFACE OF A MEMBRANE

This application is a continuation of Provisional Patent Application No. 60/156,723 filed on Sep. 30, 1999 which is incorporated herein by reference and attachment

FIELD OF THE INVENTION

The present invention is in the field of colored laminated thermoplastic and thermoset sheet materials. In particular it addresses a method for enhancing the resistance to delamination of such sheet materials

BRIEF DESCRIPTION OF THE DRAWING

FIG. 1 is a side view of an apparatus for making a two-thermoset-layers delamination resistant colored membrane.

FIG. 2 is a side view of an apparatus for making a two-thermoplastic layers delamination resistant colored membrane.

FIG. 3 is a side view of an apparatus for making a thermoset bottom layer and a thermoplastic top layer delamination resistant colored membrane.

FIG. 4 is a side view of an apparatus for making a thermoplastic bottom layer and a thermoset top layer delamination resistant colored membrane.

FIG. 5 is a cross-sectional view of uncured/unsolidified membrane after laying fibrous web on its surface.

FIG. 6 is a cross-sectional view of a two-layer delamination-resistant colored membrane.

FIG. 7 is a cross-sectional view of a three-layer delamination-resistant colored membrane.

DETAILED DESCRIPTION OF THE INVENTION

FIG. (1) shows an apparatus 52 for making a two-thermoset-layer delamination-resistant colored membrane composite. As shown therein, an uncured thermoset membrane 14 is extruded, in a sheet form, from membrane forming die 15. The membrane is formed by mixing of its first reactive component 1, contained in tank 45, with its second reactive component 2, contained in tank 46. For coloring, reinforcement, celluar stucture (foam) development or for other purposes, liquid additives 4, contained in tank 47, and/or solid additives 3 may be added to the thermoset membrane-forming mixture, in tank 48. Typically, mixture 6 is homogenized, for example by mixing stirrer 5 or other means. After mixing all the components of membrane 14, the mixture is allowed to flow into membrane-forming die 15 by opening valve 7. In some applications a pump may also be used in order to generate the required pressure and desired volume flow rate. As uncured thermoset membrane 14 is extruded from die 15, it is laid on a non-stick release liner 8 which is unwound from a roll of non-stick release liner 33, on conveyor belt 30, and rewound into a roll 35 which is driven by friction drive roll 34. Guide rolls 39, 42 and 36 are used to direct the release liner 8 and colored laminated composite as the process is performed from one end of apparatus 52 to its other end. Alternatively, release liner 8 may be eliminated if conveyor belt 30 is made of a non-sticking material or is coated with a non-sticking release coating. Conveyor rolls 31 and 32 provide an adjustable or constant rate of travel to belt 30, which, in combination with the rate of flow of mixture 6, determine the thickness of membrane 14. The thickness of membrane 14 is an important parameter in this process since subsequent operations, for example thermoforming or injection molding a layer of molten plastic on it and subsequent or simultaneous stretching of the composite may result in significant surface deformation which may alter the exterior color or the surface characteristics of the delamination-resistant colored membrane. An example of such subsequent operations that may be performed on the colored laminated composite of the present invention is disclosed in U.S. Pat. No. 5,401,457 which is incorporated herein by reference.

As uncured thermoset membrane 14 is extruded on release liner 8, its top surface 9 is of a tacky nature. Depending on its rate of curing or solidification, its surface tack and viscosity, a first partial curing zone 16 is provided in order to allow for adequate development of surface of membrane 14 before entering the fibrous media application zone 18. In doing so, one can have at least a portion of fibers, in fibrous web 37 or sprinkled fibers 38, partially encapsulated within membrane 14, as shown in FIG. 5. Such partially encapsulated fibers, when also subsequently partially encapsulated within coloring coating 20, serve as an interfacial reinforcement that provides a bond between the two layers of colored composite 44. Such an interfacial reinforcement profoundly enhances the resistance to delamination between the layers of the colored composite.

Fibrous web 37 is fed into zone 18 from fibrous web roll 10. In some applications, a guide roll 41 is used to direct fibrous web 37 to the desired location, height and point of contact with uncured or unsolidified surface 9 of membrane 14.

Fibrous web 37 may be made of woven, knitted, stitch-bonded or non-woven fibers and/or yarns. In its most preferred embodiment, fibrous web 37 is made of a needle punched non-woven in order to provide the most possible tensile and in-planre shear deformability, without breakage, during subsequent thermoforming or injection molding processes where the colored composite may be formed into three dimensional double curvature surfaces. The fibers of fibrous web 37 may be of a natural origin (for example cotton or other natural staple fibers) or of a man-made type, such as synthetic fibers, regenerated fibers or metallic fibers.

Alternatively or in addition to fibrous web 37, loose fibers 12, contained in hopper 11, may be sprinkled on the top surface 9 of uncured/unsolidified membrane 14 by using fiber sprinkler 13. As shown in FIG. (1), sprinkled fibers 38 are deposited on membrane 14 in fibrous media application zone 18. Similar to fibrous web 37, sprinkled fibers 38 may be of a natural origin or of a man-made type, such as synthetic fibers, regenerated fibers or metallic fibers.

In a similar manner, an uncured thermoset coloring coating 20 is formed and extruded through coloring coating application die 50 onto the surface of membrane 14 covered by fibrous web 37 and/or sprinkled fibers 38.

Coloring coating 50 is also prepared in a manner similar to that of preparing membrane 14. A first reactive component 22 and a second reactive component 23, of coloring coating 20, are directed from tanks 28 and 29 into mixing tank 51. Liquid additives 24, which may also include coloring agents or pigments, are also directed from tank 49 into mixing tank 51. Similarly, solid additives 25 may be added to the coloring coating mixture 26 in tank 51. The mixture is then homogenized by rotating stirrer 27 or some other means and is allowed to flow into coloring coating application die 50 by opening valve 17 and controlling flow rate to yield the desired thickness of coloring coating 20. As discussed above and for the same reasons stated in connection with membrane 14, the thickness of coloring coating 20 is an important parameter and a variety of means, known in the art, including metering pumps may be used for its control.

As uncured coloring coating 20 is extruded onto the surface of membrane 14, which is covered by fibrous web 37 and/or sprinkled fibers 38, its bottom surface 21 is of a tacky or liquid nature and thus encapsulates the remaining portions of those fibers which had been partially encapsulated within membrane 14. The two-layer thermoset composite then proceeds through curing or cooling zone 19 where the components are fully cured/solidified and directed to a take up unit along the direction of arrow 43 as a delamination-resistant colored composite 44.

Using same or similar components and zones (as 8, 10, 11, 12, 13, 16, 18, 19, 30, 31, 32, 33, 34, 35, 36, 37, 38, 39, 41, 42, and 43) shown in FIG. (1) and described above and following similar steps and thickness controls, an apparatus 63 for making a thermoplastic delamination-resistant colored composite 68 is shown in FIG. (2). As shown therein, a first molten thermoplastic membrane 53 is extruded, through molten membrane extrusion die 57, in a similar manner and is treated in the same way as uncured thermoset membrane 14. Hopper 61 feeds the thermoplastic material into plasticating extruder 59 which, in turn, melts it and feeds it into die 57. Also, similarly, the top surface 55 of molten thermoplastic membrane 53 is treated and coated with fibrous web 37 and/or sprinkled fibers 38 in a manner similar to that of treating top surface 9 of membrane 14. Also, as shown in FIG. (2), a similar thermoplastic coloring coating 54 is produced by using feeding hopper 62, plasticating extruder 60 and molten coloring coating extrusion die 58. The thermoplastic material contained in feeding hopper 62 may be of a pre-compounded colored nature or a blend of colored and uncolored thermoplastic materials selected to produce the desired exterior color of composite.

Also, similarly, the bottom surface 56 of molten thermoplastic coloring coating 54 is treated and coated with fibrous web 37 and/or sprinkled fibers 38 in a manner similar to that of treating top surface 9 of membrane 14.

Again, using combinations of same or similar components and zones, as shown in FIGS. (1) and (2) and as described above, FIG. (3) shows a side view of an apparatus 64 for making a thermoset bottom layer and a thermoplastic top layer delamination resistant colored composite 66 and FIG. (4) shows a side view of an apparatus 65 for making a thermoplastic bottom layer and a thermoset top layer delamination resistant colored composite 67.

FIG. 5 shows an uncured or molten membrane 69 in fibrous application zone 18 with fibers 73 completely encapsulated within it, fibers 71 partially ecapsulated in it and other loose fibers 72 lying completely outside of it. As shown therein, first layer 70 has a bottom surface 95 and a top uncured or molten surface 85.

FIG. 6 shows a cross-sectional view of a two-layer delaminatio-resistant colored composite 74 comprising bottom layer 70, top layer 84, joined at their interface 86, and having fibers 71 partially encapsulated in bottom layer 70 and partially encapsulated in top layer 84, thus providing enhanced resistance to delamination.

FIG. 7 shows a cross-sectional view of a three-layer delamination resistant colored composite 75 comprising bottom layer 76, middle layer 77, top layer 78, joined at their respective interfaces 87 and 88 and, as described earlier, having an enhanced resistance to delamination which is attributable to interlaminar reinforcement fibers 80 and 82. Such a colored composite may be produced by combining a plurality of successive membrane-making steps, fibrous web/sprinkled fibers application zones and coloring coating membrane application zones of thermoplastic and thermoset materials as descibed in this invention.

It should be noted that other variants of the above described methods or combinations of their steps may be utilized, for coloring the surface of a thermoset or thermoplastic membrane, without departing from the spirit and scope of the disclosed invention.

What is claimed is:

1. A method for coloring the surface of a membrane with a delamination-resistant coloring coating, said method comprising the steps of;

forming a membrane, said membrane having a tacky surface, laying a fibrous material onto said tacky surface of said membrane such that portions of fibers, comprising said fibrous material, are encapsulated, below said surface of said membrane and within said membrane, and applying a coloring coating, in a liquid form, onto said fibrous material such that remaining portions of said fibers are encapsulated within said coating, whereby fibers encapsulated by and originating within said membrane are also partially encapsulated and terminating within said coloring coating, thus providing a delamination-resistant mechanical bond between said membrane and said coloring coating.

* * * * *